Inventor:
Wolfgang Dillenburger
by
Attroney

Inventor:
Wolfgang Dillenburger
by Michael J. Striker
Attorney

United States Patent Office 3,424,938
Patented Jan. 28, 1969

3,424,938
TELEVISION CAMERA TUBE APPARATUS
Wolfgang Dillenburger, Nieder-Ramstadt, near Darmstadt, Germany, assignor to Fernseh G.m.b.H., Darmstadt, Germany
Filed May 14, 1965, Ser. No. 455,923
Claims priority, application Germany, May 23, 1964, F 42,965
U.S. Cl. 315—11 11 Claims
Int. Cl. H01j *31/36*

ABSTRACT OF THE DISCLOSURE

This invention relates to television camera tube apparatus and is particularly concerned with an improved arrangement for varying the response to incident light of camera tubes of the image-storage type.

Hitherto the modulation of a television camera tube by the image-forming light has been controlled by adjusting the amount of light incident upon the photocathode of the tube. For example the aperture of the lens which projects an image of the scene to be transmitted upon the photocathode, or the density of a neutral filter disposed in the optical path has been altered for this purpose. As a rule the adjustment of the lens aperture or of the filter density is effected by a device driven by an electric motor, so that the regulation of the amount of light may be effected by remote control or automatically in accordance with the brightness of the scene by means of a control signal derived from the television signal generated by the camera tube.

When such control arrangements for camera tubes are employed in television cameras it is a serious disadvantage as regards the simultaneous pickup of the program sound that the adjusting device driven by the motor produces a more or less loud noise when in operation. In particular, it is extremely difficult to maintain the necessary very low noise level when the whole range of adjustment of the control is traversed in the short time of a few seconds. Mechanical difficulties often appear in the construction of the gearing and in the choice of the motor itself; for example, the power delivered by the motor may be dependent upon the temperature, so that in some circumstances difficulty in starting may occur when operating in low ambient temperatures. In addition, a mechanical control for the amount of light of the kind described above is expensive and increases the weight and size of the television camera in which it is incorporated.

Television camera tube apparatus according to the invention avoids disadvantages of known apparatus by including means for varying the portion of a recurrent time cycle during which an accelerating voltage is effective to transfer electrons emitted from the photocathode of a camera tube to a charge-storage electrode in such a manner that the modulation of the camera tube varies by an amount less than the variation in the amount of light incident upon said photocathode.

In the simplest embodiment of the invention the potential difference between the photocathode and the storage electrode of the camera tube is cyclically changed so that for part of each cycle the photocathode is brought to a potential positive with respect to the storage electrode.

By the use of the present invention the modulation of the camera tube in a television camera is controlled by wholly electronic means, without moving mechanical parts. The difficulties accompanying the mechanical control explained earlier are therefore completely avoided.

In apparatus according to the invention using an image-orthicon camera tube the potential of the photocathode is cyclically changed, for a variable portion of the cycle, to a value such that photoelectrons cannot land upon the storage target. For example, where the photocathode is in operation held at a potential of some −400 v. with respect to the storage target, it is periodically brought to a potential at least a few volts positive with respect to that of the storage electrode. The pulse repetition rate of the impulses used to effect this change in voltage is preferably equal to the normal time of storage or to an integral multiple or simple fraction thereof in order to be able readily to avoid the appearance of interfering impulses in the picture. The normal storage time of an image-orthicon type of camera tube amounts to approximately $\frac{1}{50}$ second. The pulses may therefore be synchronous with the vertical deflection (50 or 60 c./s.)

The invention will now be more particularly described with reference to the accompanying drawings comprising FIGS. 1 to 3, of which:

All elements which are not essential to the understanding of the invention are ignored in the following description.

Figure 1:
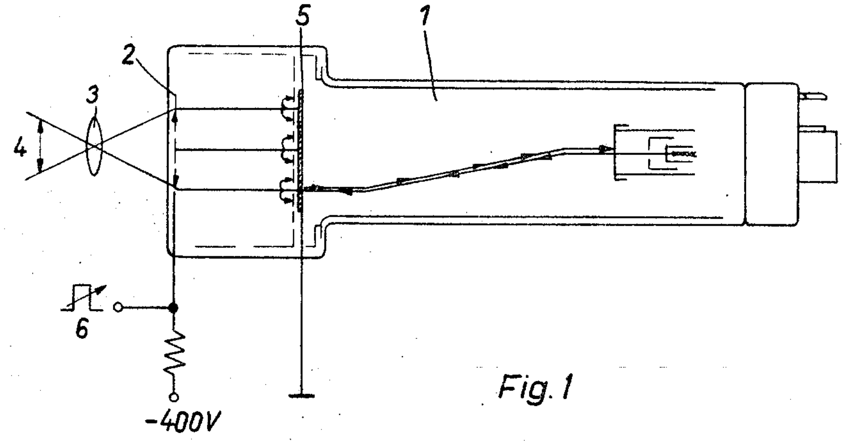
FIG. 1 is a schematic diagram of a camera tube of the image-orthicon type, used to explain the mode of operation of apparatus according to the invention.

In FIG. 1, reference 1 denotes a camera tube of the image-orthicon type. On the photocathode 2 of camera tube 1 there is projected by means of a lens 3 an image of the scene to be transmitted, conventionally represented by arrowed line 4. Electrons emitted from photocathode 2 are accelerated upon a storage electrode 5 by means of an electrostatic field. To this end the photocathode is held when in normal operation at a potential of, for example, −400 v. with respect to the storage electrode 5, which is held at earth potential.

Upon this potential difference there is now superimposed a positive going train 6 of impulses of such amplitude that during the implse periods the photocathode 2 becomes a few volts positive with respect to the storage electrode 5, so that photoelectrons cannot then pass to the storage electrode.

Figure 2:
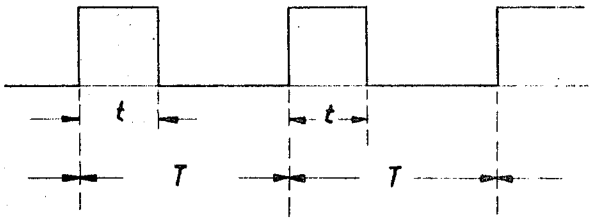
FIG. 2 is a waveform diagram of impulses used in apparatus according to the invention.

FIG. 2 shows a train of impulses such as may be used for pulsing the photocathode. The repetition rate of these impulses may, for example, be equal to the vertical scanning frequency. The implses then follow one another at a time-separation of e.g. $\frac{1}{50}$ second. The width $t$ of the pulses is variable, for example, between $\frac{1}{50}$ and $\frac{1}{500}$ second, so that the storage electrode receives electrons from the photocathode only during a corresponding fraction of the cyclic period and the same effect is obtained as though the amount of light falling upon the photocathode had itself been varied over a range of 10:1.

The rise-time of the pulses applied to the photocathode should be small as compared with the normal time of storage, in order that as few as possible of the electrons liberated during the transition regime shall reach the storage electrode. During the transition regime the normal process of electron imaging between photocathode and storage electrode is ineffective, so that the electrons then reaching the storage target are dispersed over the sharp charge image and, if the rise-time of the pulse edges were excessive, would give rise to an additional charging of the storage electrode, which on scanning the storage electrode would result in a small change in the black level. On the other hand the rise-time should not be too short, since otherwise the sudden interruption of the storage process may become visible in the picture as an abrupt change in level. It is found in practice that it is advantageous for the pulse rise-time to be less than the duration of one scanning line and specifically for the rise-time to have a value lying within the limits of 30 percent and 50 percent of the duration of one scanning line. It may also be advantageous to give the pulse edge the form of a half sine-wave.

Figure 3:
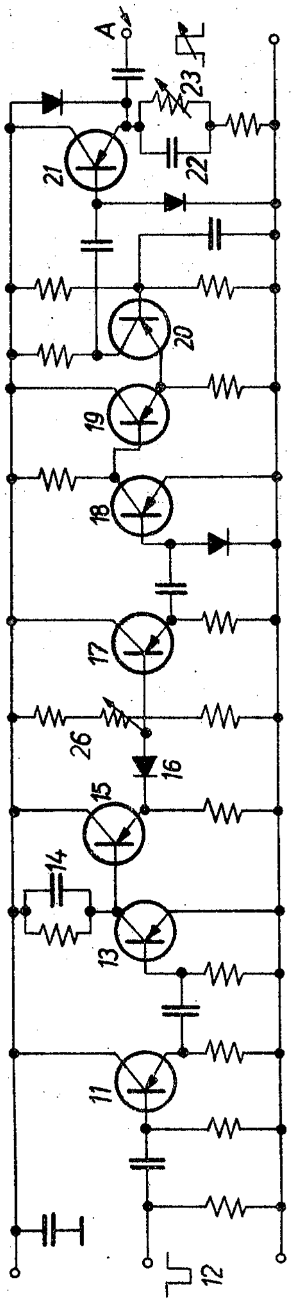
FIG. 3 is a circuit diagram of apparatus suitable for generating impulses used in apparatus according to the invention.

FIG. 3 shows an embodiment of a circuit arrangement suitable for producing the train of impulses used in carrying out the invention. To the base of a transistor 11, connected as an emitter-follower impedance converter, there are applied vertical synchronizing impulses 12 which are used to synchronize the operation. From these synchronizing impulses there is derived a train of impulses of a variable width, of which the duration may be varied, for example, between 2 $\mu$s. and 20 $\mu$s. The low-impedance synchronizing signals from the emitter of transistor 11 are applied to the base of a further transistor 13, having in its collector lead a capacitor 14, with a value which may be 25 $\mu$f., across which a voltage of sawtooth waveform is produced. Each vertical synchronizing impulse charges capacitor 14, which then discharges during the remainder of the scanning cycle. The potential appearing across capacitor 14 is applied to the base of a further emitter-follower impedance converter transistor 15. The amplitude of the sawtooth voltage arising at the emitter of transistor 15 is limited by a variably biased diode 16, so that there results at the base of a further emitter-follower transistor 17 a clipped sawtooth voltage in which the width of the flats can be adjusted as desired by varying the clipping level of diode 16 by the potentiometer 26. The clipped signals are passed to transistors 18, 19, 20 by which they are amplified and clipped at both ends to yield a sharp pulse of variable duration. A time-constant circuit, formed by the parallel combination of a capacitor 22 and an adjustable resistor 23 connected in the emitter lead of a transistor 21 allows the slope of the pulse edges to be adjusted to a suitable value.

Figure 4:
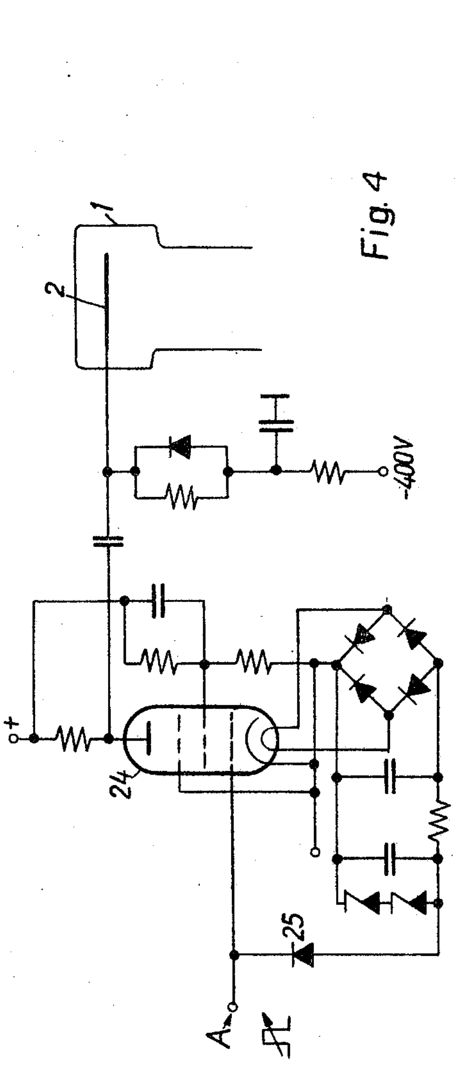
FIG. 4 is another circuit diagram according to the invention.

As shown in FIGURE 4, the pulse of variable width is applied to the grid of a valve 24 (e.g. a Mullard PL81) at the anode of which there results an impulse with an amplitude of some 500 v. a diode 25 prevents the potential of the control grid of the tube 24 from becoming more negative than the bias of the tube 24. This negative going impulse is applied to the photocathode 2 of an image-orthicon camera tube 1, and a sharp electron image is transferred from the photocathode to the storage electrode of camera tube 1. During the intervals between the pulses no electron imaging action takes place.

In another embodiment of the invention the impulse of variable width is applied to a start-stop oscillator or to a modulator, to which also is applied a carrier-frequency signal having a frequency which may either be equal to the horizontal frequency or may be substantially higher than the highest video frequency (e.g. 10 mc./s.) in order to avoid visible interference in the picture. The pulsed carrier-frequency signal obtained from the oscillator or from the modulator may be generated at a low voltage. This low voltage is then increased to the required high value of, for example, 400 v., in a transformer and, after rectification and appropirate smoothing, is made use of to drive the photocathode. The use of a modulator has the advantage that it becomes unnecessary to provide the high anode voltage which is required when a thermionic valve is used to generate the impulses.

What is claimed and desired to be secured by Letters Patent is:

1. Television camera tube apparatus comprising in combination: a television camera tube having a photocathode liberating electrons in response to incident light; a storage target and electron gun means directing an electron beam upon said target; optical means projecting a variable quantity of light to form an image upon said photocathode; a direct voltage source; means applying said direct voltage from said source between said photocathode and said target electrode to cause said liberated electrons to be transferred to said target; scanning means controlled by cyclically recurrent vertical and horizontal synchronizing signals causing said electron beam to scan said target in a line pattern; to develop an output signal of amplitude dependent upon the quantity of said transferred electrons; pulse generator means developing unidirectional voltage, pulses of amplitude not less than said unidirectional voltage, said pulses occurring during a variable portion of a recurrent time cycle; means applying said voltage pulses to said photocathode in opposition to said direct voltage thereby inhibiting transfer of said liberated electrons; and means operable to control said variable portion of said time cycle so as to reduce variations in the amplitude of said output signal due to changes in said quantity of light.

2. Apparatus as defined in claim 1 in which said pulse generator means develops a voltage pulse having a rise-time less than the duration of one line of said scanning pattern.

3. Apparatus as defined in claim 1 in which said pulse generator means develops voltage pulses having a rise-time of which the duration lies within the limits of 30 percent and 50 percent of the duration of one line of said scanning pattern.

4. Apparatus as defined in claim 1 in which said voltage pulses rise and fall in accordance with a sinusoidal time function.

5. Apparatus as defined in claim 1 in which said voltage pulses are recurrent at the cyclic rate of said vertical synchronizing signals.

6. Television camera apparatus comprising in combination: a television camera tube having a photocathode liberating electrons in response to incident light, a storage target and electron gun means directing a beam of electrons upon said target; optical means directing a variable quantity of light to form an image upon said photocathode; a source of a direct voltage; means applying said direct voltage between said photocathode and said target to cause liberated photoelectrons to be transferred to said target; scanning means controlled by vertical and horizontal synchronizing signals causing said beam to scan said target in a line pattern to develop an output signal dependent in amplitude upon the quantity of said transferred electrons; pulse generator means developing initial pulses of variable duration; control means controlled by applied pulses to yield oscillatory output signals of like duration to said pulses; circuit means applying said initial pulses to said control means; a voltage transformer having a low-voltage input and a high-voltge output; circuit means applying said oscillatory signals to said transformer input; rectifier means having an alternating voltage input and a unidirectional voltage output; circuit means connecting said transformer output with said rectifier input to yield unidirectional voltage pulses at said rectifier output; circuit means applying said unidirectional pulses to said photocathode in opposition to said unidirectional voltage thereby to inhibit transfer of said electrons; and means operable to control said initial pulse duration to reduce variations in the amplitude of said output signals due to changes in said quantity of light.

7. Apparatus as defined in claim 6 in which said control means comprises the combination of: a start-stop oscillator keyed by an applied pulse to develop an oscillatory voltage and circuit means applying said initial pulses to key said oscillator.

8. Apparatus as defined in claim 6 in which said control means comprises the combination of: a source of continuous oscillatory signals; pulse modulator means having a control input, a signal input and an output; circuit means applying said initial pulses to said modulator control input; circuit means connecting oscillatory signals from said source to said modulator signal input; and circuit means connecting said modulator output to said voltage transformer input.

9. Apparatus as defined in claim 6 in which said oscillatory signals are equal in frequency to and synchronous with said horizontal synchronizing signal.

10. Apparatus as defined in claim 6, in which said oscillatory voltage has a frequency exceeding the maximum frequency of a component of said output signal.

11. Apparatus as defined in claim 6 in which said oscillatory voltage has a frequency exceeding 10 mc./s.

References Cited

UNITED STATES PATENTS

| | | | |
|---|---|---|---|
| 2,786,960 | 3/1957 | Palmer | 315—10 |
| 2,981,863 | 4/1961 | Schneeberger et al. | 315—12 |

RODNEY D. BENNETT, *Primary Examiner.*

JEFFREY P. MORRIS, *Assistant Examiner.*